United States Patent [19]

Imoto et al.

[11] Patent Number: 4,822,128
[45] Date of Patent: Apr. 18, 1989

[54] OPTICAL FIBER STAR COUPLER AND METHOD OF MANUFACTURING THE SAME

[75] Inventors: Katsuyuki Imoto, Sayama; Hirohisa Sano, Kokubunji, both of Japan

[73] Assignee: Hitachi, Ltd., Tokyo, Japan

[21] Appl. No.: 919,635

[22] Filed: Oct. 16, 1986

[30] Foreign Application Priority Data

| Oct. 16, 1985 | [JP] | Japan | 60-228685 |
| Feb. 5, 1986 | [JP] | Japan | 61-21920 |
| Mar. 12, 1986 | [JP] | Japan | 61-52437 |

[51] Int. Cl.[4] ............................................. G02B 6/28
[52] U.S. Cl. ................................. 350/96.16; 350/96.15
[58] Field of Search ............... 350/96.15, 96.16, 96.22, 350/96.24, 96.29; 65/3.12

[56] References Cited

U.S. PATENT DOCUMENTS

| 4,550,974 | 11/1985 | Murphy | 350/96.15 |
| 4,591,372 | 5/1986 | Bricheno et al. | 350/96.15 |
| 4,593,968 | 6/1986 | Giallorenzi | 350/96.15 |
| 4,647,146 | 3/1987 | Karr, III et al. | 350/96.15 |

*Primary Examiner*—Stanley D. Miller
*Assistant Examiner*—David R. Bertelson
*Attorney, Agent, or Firm*—Antonelli, Terry & Wands

[57] ABSTRACT

While a middle part of a plastic optical fiber bundle in a lengthwise direction thereof is being heated, it is twisted, and it is pulled in axial directions of the bundle. A biconically tapered portion is formed at the middle part of the bundle by the twisting and the pulling. When the biconically tapered portion has been formed into a predetermined shape, the heating is stopped, and simultaneously, a gas is blown against an outer periphery of the biconically tapered portion so as to rapidly cool this tapered portion. The biconically tapered portion is solidified to the predetermined shape by the rapid cooling.

11 Claims, 11 Drawing Sheets

BEFORE PULLING

AFTER PULLING

FIG. 14

| PULLING RATIO | CLADDING DIAMETER (μm) | CORE DIAMETER (μm) | CLADDING THICKNESS (μm) | PROPAGATING MODE NUMBER | DECREASING RATIO OF PROPAGATING MODE NUMBER (%) |
|---|---|---|---|---|---|
| 1 | 750 | 730 | 10 | 8154637 | 0 |
| 1.42 | 500 | 487 | 6.5 | 3628686 | 55.5 |
| 1.92 | 300 | 292 | 4 | 1304539 | 84 |
| 2.24 | 200 | 195 | 2.5 | 581782 | 92.9 |
| 2.42 | 150 | 146 | 2 | 326135 | 96 |

OPTICAL FIBER STAR COUPLER AND METHOD OF MANUFACTURING THE SAME

BACKGROUND OF THE INVENTION

The present invention relates to an optical fiber star coupler by which a light beam transmitted through an optical fiber is divided to a plurality of optical fibers, and a method of manufacturing the optical fiber star coupler. It is well suited to form a star coupler by the use of plastic optical fibers.

With the rapid progress of optical fiber transmission technology, there have been vigorously made researches on and developments of optical data links which use optical fibers for the data transmission between electronic computers and between an electronic computer and a terminal. In constructing the optical data links, the optical star coupler which can mix optical signals from a plurality of input optical fibers and then divide them to a plurality of output optical fibers with low loss and equally is an indispensable device.

Heretofore, a typical example of the optical star coupler has been a biconically tapered type shown in FIG. 4. Such biconically tapered type optical star coupler is shown, for instance, in (i) "Optical Communication Handbook" edited by Hisayoshi Yanai and issued by Asakura-Shoten on Sept. 1, 1982, pages 324 and 325, (ii) T. Ozeki et al.: Electronics Letters, Vol. 12, No. 6 (1976), pages 151 and 152, and (iii) E. G. Rawson et al.: Electronics Letters, Vol. 14, No. 9 (1978), pages 274 and 275. Accordingly, it is well known.

In this optical star coupler, a multiplicity of optical fibers 1 are bundled together, and the middle part of the bundle is pulled under twisting while being heated by a heating source, to form a biconically tapered region 2, whereby optical signals from the input optical fibers (the left side of the tapered region 2) are divided to a plurality of output optical fibers (the right side of the tapered region 2).

As regards the prior-art optical fiber star coupler, there are reports in the case where the optical fibers are of a glass material, but there is no report in the case where a plastic material is employed. In view of the results of various experiments and trial manufacture conducted by the inventors of the present invention, the reasons will be ascribable to problems as stated below.

As the first reason, it has been revealed that, since plastic optical fibers have a low melting point (about 100° C.) and react very sensitively to temperatures, they are liable to unnecessary deformations or breakage attributed to fusion, to incur the problem of thermal workability. Therefore, even when the plastic fibers are intended to be twisted and pulled under heating so as to attain a desired biconically tapered shape, they fuse and rupture instantly at an intermediate stage. It has accordingly been difficult to work the plastic fibers into the biconically tapered shape which achieves an equally dividing characteristic.

As the second reason, in general, the plastic optical fiber has a large diameter (usually, an outside diameter of 0.5–1.0 mm) as shown in FIGS. 13A and 13B, and the refractive index difference between a core 3 and a cladding 4, $\Delta n$ $$( = \frac{n_1 - n_2}{n_1} \times 100\%,$$

$n_1$: refractive index of the core, $n_2$: refractive index of the cladding) is about 6%, which is much greater than the index difference of a silica glass optical fiber. Therefore, the degree of power concentration in the core is very high. The value will be calculated by way of trial. The degree of power concentration $P_c$ in the core is expressed by:

$$P_c = \left(1 - \frac{8}{3V}\right) \times 100\% \quad (1)$$

where $$V = \frac{2\pi a}{\lambda} \sqrt{n_1^2 - n_2^2} \quad (2)$$

a: core diameter
$\lambda$: wavelength

Assuming $a=730$ μm, $P_c=99.93\%$ is evaluated, and most light is confined within the core and is thus propagated. In addition, though the thickness of the cladding is thin in the case of the plastic fiber, it is usually as great as about 10 μm. For this reason, in order to realize the optical star coupler of the equally dividing characteristic by bundling such fibers, a core mode needed to be converted to a cladding mode at a stretch by increasing the number of times of twisting and shortening the pitch of twisting in the extreme. It has been revealed, however, that when the number of times of twisting is increased and the pitch of twisting is shortened in this manner, the converting from the core mode to the cladding mode involves a radiation mode in a very large proportion, which increases a radiation loss, resulting in an optical star coupler of heavy excess loss (for example, about 5 dB in a 2×2 port type optical star coupler having two input ports and two output ports). It has also been revealed that, when the optical fibers are pulled after or while being twisted, the individual optical fibers are not pulled uniformly, so losses fluctuate greatly between the ports. Especially in a case where the number of the fibers is large, the pulling lengths of the fiber near the central part of the fiber bundle and the fiber near the peripheral part thereof become unequal. This has been attributed to the fact that, since the fiber has the large outside diameter, the fibers bundled and then twisted come to have a very large outside diameter, so the difference of the heating temperatures of the peripheral part and the central part arises. When the pulling lengths of the individual fibers are unequal in this manner, the amount of converting from the core mode to the cladding mode in the tapered portion on the input side becomes ununiform. Besides, the amount of converting from the cladding mode to the core mode in the tapered portion on the output side becomes ununiform. As a result, the loss fluctuations between the respective ports become great.

SUMMARY OF THE INVENTION

An object of the present invention is to provide a biconically tapered type optical star coupler of low loss and low power deviation characteristics which is made of plastic optical fibers.

The object is accomplished in such a way that the outer peripheral surface of a biconically tapered portion is quenched by blowing a gas against it when a desired shape has been realized in case of forming and working a plastic optical fiber bundle into the biconically tapered shape.

In addition, the object is accomplished by manufacturing an optical fiber type star coupler of biconically tapered shape in such a way that plastic optical fibers are bundled after coating the outer peripheral surfaces of the optical fibers with a solvent for dissolving the optical fibers, or that an optical fiber bundle is previously coated with the solvent, and that the optical fiber bundle is thereafter heated, whereupon it is pulled while being twisted in accordance with the softening thereof.

Yet in addition, the object is accomplished in such a way that individual optical fibers are pulled beforehand, that these pulled optical fibers are bundled, and that the pulled part is twisted, fused and pulled while being heated, into an optical star coupler.

BRIEF DESCRIPTION OF THE DRAWINGS

FIG. 14 is a diagram showing the characteristics of pulled fibers; and

DETAILED DESCRIPTION OF PREFERRED EMBODIMENTS

In case of manufacturing a plastic optical fiber star coupler, a plastic fiber bundle is first heated by a heating source (for example, electric heater) up to a temperature at which fibers soften. When the softening temperature has been reached, the fiber bundle is pulled in axial opposite directions while being twisted. The twisting and the pulling are performed until the output optical powers of the individual fibers on the output side of the fiber bundle are equally divided by putting light into any one of the fibers on the input side. In this regard, as the fiber bundle is pulled into a biconically tapered shape, the middle part of the fiber bundle decreases in the cross-sectional area thereof. It is therefore the phenomenon of the prior-art method that the softening becomes conspicuous due to a raised rate of heat conduction, so the fiber bundle fuses and ruptures. Even when the heating source is quickly turned off midway, the middle part of the fiber bundle having once begun to soften fuses inevitably as the fiber bundle is pulled. In contrast, the first embodiment of the present invention consists in a method in which, the moment the equally dividing characteristic has been substantially realized, a gas is forcibly blown against the outer peripheral surface of the biconically tapered portion, thereby quenching the biconically tapered portion so as to check the promotion of the softening thereof. As a result, the fusing is not involved, and a low power deviation characteristic is maintained. Furthermore, since the biconically tapered portion undergoes a compression stress owing to the quenching, the mechanical strength thereof rises. In addition, the blowing of the gas is not attended with any unnecessary deformation and can suppress the adhesion and mixing of impurities (for example, dust and moisture in the air, alkaline metal ions, alkaline-earth metal ions and transition metal ions) on and into the biconically tapered portion, so that a low loss characteristic is attained.

Figure 1:
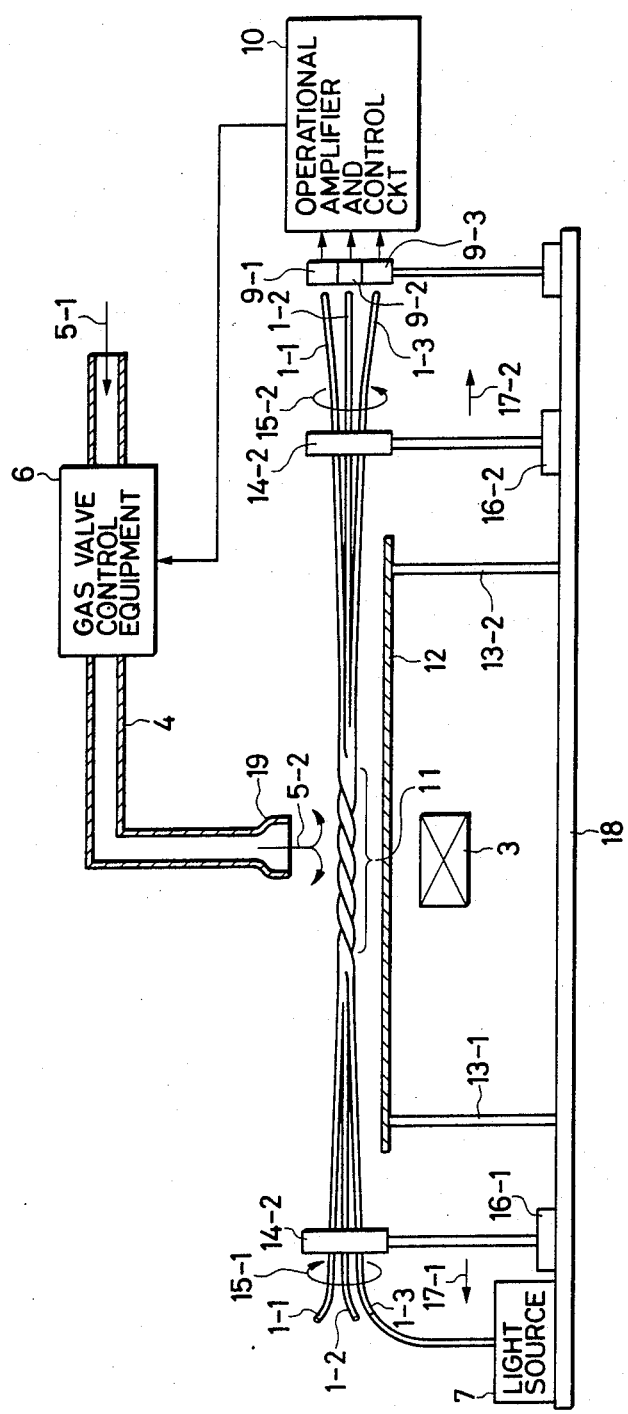
FIG. 1 is a view showing an embodiment of a manufacturing method according to the present invention.

FIG. 1 shows a schematic view of the first embodiment of a method of manufacturing a plastic optical fiber star coupler according to the present invention. This embodiment is the manufacturing method for a 3×3 fiber type optical star coupler in which both the numbers of input port fibers and output port fibers are three. Each of plastic fibers 1-1, 1-2 and 1-3 has a core made of polystyrene (refractive index 1.59) and a cladding made of polymethyl methacrylate (refractive index: 1.49). The outside diameter of the cladding is 0.7 mm. The three fibers are fixed to fixing portions 14-1 and 14-2, and the light of a light source 7 (in this case, a He-Ne laser source was used) is caused to enter the input port side of the fiber 1-3. The fixing portions 14-1 and 14-2 include mechanism portions which are rotated in the directions of arrows 15-1 and 15-2, respectively. Shown at numeral 3 is a heating source, as which a hydrogen burner capable of raising and lowering temperatures more conveniently was used. Otherwise, an electric heater, a hot air drier, an RF induction heater or the like may be used. Numeral 12 designates a glass plate, which is a protective plate that serves to prevent the flames and wind pressure of the hydrogen burner from directly acting on the fiber bundle and incurring any unnecessary deformation and which brings forth an indirect heating effect. Symbols 13-1 and 13-2 denote pedestals for supporting the glass flat plate 12. Moving portions 16-1 and 16-2 are furnished with mechanisms capable of moving in the directions of arrows 17-1 and 17-2 on a base 18, respectively. Optical detectors 9-1 to 9-3 are constructed in the shape of an array, and they convert into electric signals the output lights of the respective output port fibers 1-1, 1-2 and 1-3. Numeral 10 indicates an operational amplifier and control circuit, which is so set as to generate a voltage signal for driving a gas valve control equipment 6 when the output signals of the respective optical detectors 9-1, 9-2 and 9-3 have become substantially equal. Such a circuit can be readily realized using conventional arithmetic circuits, amplifier circuit etc. The gas valve control equipment 6 which is normally closed is opened by the signal of the operational amplifier and control circuit 10, and a gas fed in the direction of an arrow 5-1 is caused to flow in the directions of arrows 5-2. Shown at numeral 19 is a gas blast nozzle. Next, the operation of the manufacturing method in FIG. 1 will be explained. The heating source 3 constructed of the hydrogen burner is ignited to indirectly heat the plastic fiber bundle (1-1, 1-2, 1-3). The flow rate of $H_2$ gas is at most 1 lit./min. When the plastic fiber bundle has begun to soften after the heating, the rotating mechanism portions of the fixing portions 14-1 and 14-2 are driven to rotate (3-10 revolutions) in the directions of the arrows 15-1 and 15-2 respectively, whereby the softened optical fiber bundle is twisted. During the rotations or after the rotations, the moving portions 16-1 and 16-2 are driven to move in the directions of the arrows 17-1 and 17-2 respectively. The movements are performed until the output signals of the respective optical detectors become equal. At the stage at which they have equalized, the valve control equipment 6 operates, and the gas (the air was used in this case, but a gas such as $O_2$, $N_2$, Ar or He may well be employed) coming in the direction of the arrow 5-1 is caused to flow in the directions of the arrows 5-2, thereby to quench a twisting, fusing and pulling portion 11 (biconically tapered portion). The hydrogen burner 3 is turned off to be put out automatically or manually at the stage at which the output signals of the optical detectors have equalized. The optical star coupler prepared by such a method exhibited an excess loss of 0.83 dB and a power deviation of ±0.6 dB. A 15×15 fiber type optical star coupler was similarly prepared, and the results of an excess loss of 2.54 dB and a power deviation of ±1.35 dB were obtained.

Figure 2:
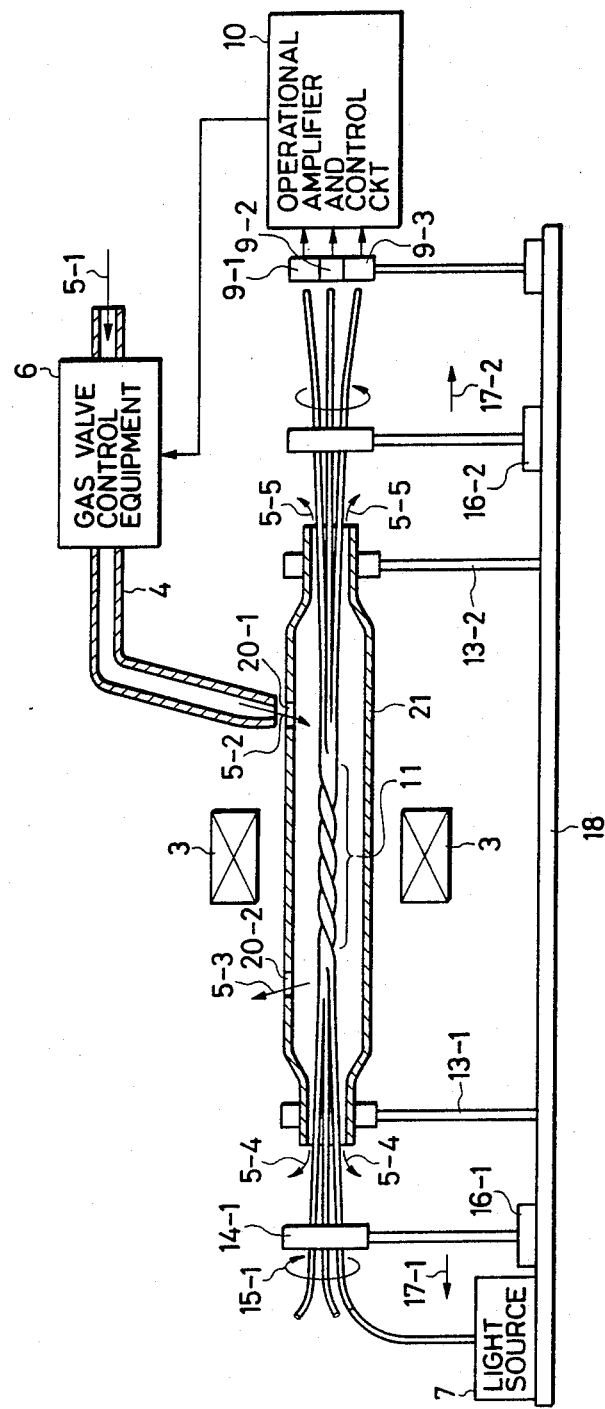
FIG. 2 is a view showing another embodiment of the manufacturing method of the present invention.

FIG. 2 shows the second embodiment of the method of manufacturing a plastic optical fiber star coupler according to the present invention. This corresponds to a case where the glass flat plate 12 in FIG. 1 is replaced with a glass tube (a quartz glass tube, a pyrex glass tube or the like) 21. In order to forcibly cool the biconically tapered portion 11, the glass tube 21 is provided with a hole 20-1. The gas is caused to flow into the glass tube 21 through the hole 20-1 as indicated by an arrow 5-2, and is caused to flow out as indicated by arrows 5-3, 5-4 and 5-5. The gas may well be caused to flow in also through a hole 20-2.

Figure 3A:
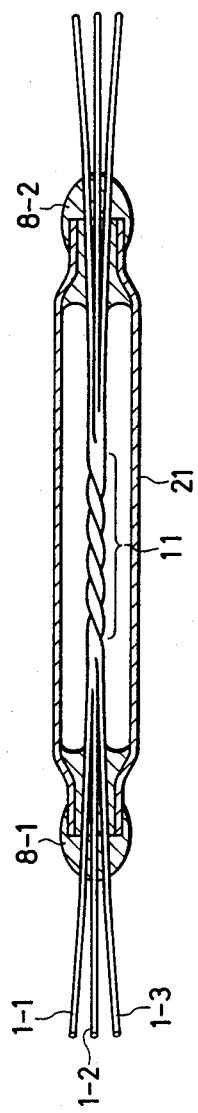
FIGS. 3A and 3B are schematic views each showing a plastic optical fiber star coupler in an embodiment of the present invention.
Figure 3B:
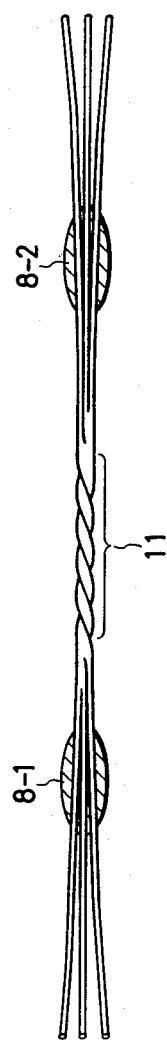
Figure 4:
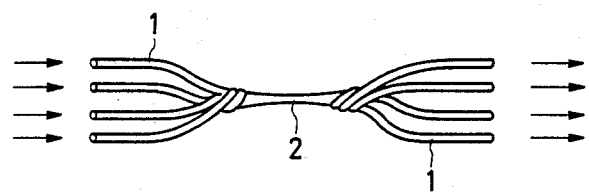
FIG. 4 is a schematic view of an optical fiber star coupler in a prior art.

FIGS. 3A and 3B show schematic views of plastic optical fiber star couplers produced by the embodiments. Shown in FIG. 3A is a structure in which the biconically tapered portion 11 is inserted within the glass tube 1, and both the ends of the tube are sealed by binder deposits 8-1 and 8-2. It has been manufactured by the method of the embodiment in FIG. 2. Shown in FIG. 3B is a structure in which, after the preparation by the method of the embodiment in FIG. 1, the vicinities of the left and right ends of the biconically tapered portion 1 are respectively fixed by binder deposits 8-1 and 8-2. Incidentally, the biconically tapered portion 11 may well be covered with a transparent material which has a refractive index lower than that of the cladding of the fiber. Thus, an optical star coupler which is excellent in reliability can be formed.

One of the inventors of the present invention and joint inventors have already proposed it in U.S. patent application Ser. No. 772,914 and European patent application publication No. 0174014 that the biconically tapered portion of a biconically tapered type optical star coupler formed of glass optical fibers be received in a protective tube.

The present invention is not restricted to the foregoing embodiments. For example, the numbers of input and output ports may be two or more. Usable as the material of the plastic fibers is any of various materials such as Teflon (trade name of Du Pont Inc.), polychlorostyrene, polytrifluoroisopropyl methacrylate, polycarbonate, and diethyleneglycol bisarylcarbonate. In addition, a burner of any combustible gas not containing oxygen or the like oxidizing gas, such as town gas or propane gas, may be employed otherwise than the hydrogen burner. The quenching effect can also be expected in such a way that the quenching gas to flow in the directions of the arrows 5-1 and 5-2 is normally kept flowing during the twisting, fusing and pulling of the optical fiber bundle and that the hydrogen burner 3 is turned off at the stage at which the equally dividing characteristic has been achieved. In this case, the flow rate of the gas need to be suitable for sufficiently cooling the surface of the optical fiber bundle and may be set at or above 2 lit./min. The flow rate of the gas normally kept flowing may well be increased the moment the hydrogen burner 3 has been turned off. When the optical fiber bundle is worked while the gas is normally kept flowing as described above, the mixing of impurities into the optical fiber bundle can be prevented, and a low loss characteristic can be expected. Moreover, since impurity ions and organic gases produced during the heating can be exhausted, deterioration in the plastics can be prevented.

The embodiments bring forth the effect that a plastic optical fiber star coupler having low loss and low power deviation characteristics can be readily fabricated as the biconically tapered type.

Figure 5A:
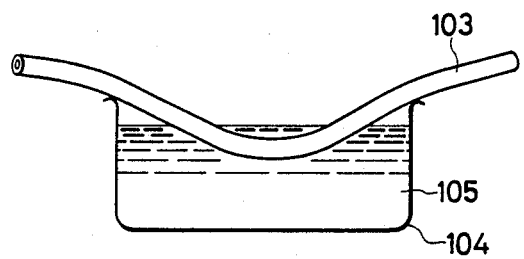
FIGS. 5A and 5B are views showing an embodiment of the present invention in which a solvent is deposited on the outer peripheral surface of an optical fiber.
Figure 5B:
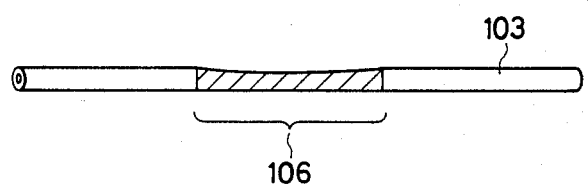

FIGS. 5A and 5B show the third embodiment of the present invention in which a solvent is applied to the outer peripheral surface of a plastic optical fiber. Numeral 103 designates a plastic optical fiber, the core of which is made of polystyrene (refractive index: 1.54) and the cladding of which is made of polymethyl methacrylate (refractive index: 1.49). Numeral 104 indicates a vessel for containing a solvent 105. A cellosolve system or ketone system is appropriate for the solvent 105, and methyl isobutyl ketone or methyl ethyl ketone is mentioned by way of example. In this embodiment, methyl isobutyl ketone was used. The dissolution degree of the outer peripheral surface of the plastic fiber can be controlled by the period of time for which the plastic fiber is immersed in the solvent 105. FIG. 5B shows the plastic fiber with the solvent 105 deposited thereon, and a part 106 is a solvent-deposited portion. The period of time of the immersion of the plastic fiber in the solvent 105 was variously changed between 30 seconds and 10 minutes. In a case where the immersion period of time was long, the surface of the fiber became rugged to be devitrified. This is attributed to the fact that the dissolution proceeded excessively. The appearance of the ruggedness can be prevented by mixing an alcoholic liquid (for example, isopropyl alcohol or methanol) into the solvent 105 as a dissolution depressor. In this case, the mixing ratio between the solvent and the dissolution depressor is selected from within a range from 1-to-1 to 1-to-3 or so. The dissolution rate can also be controlled by the temperature of the solvent.

Figure 6:
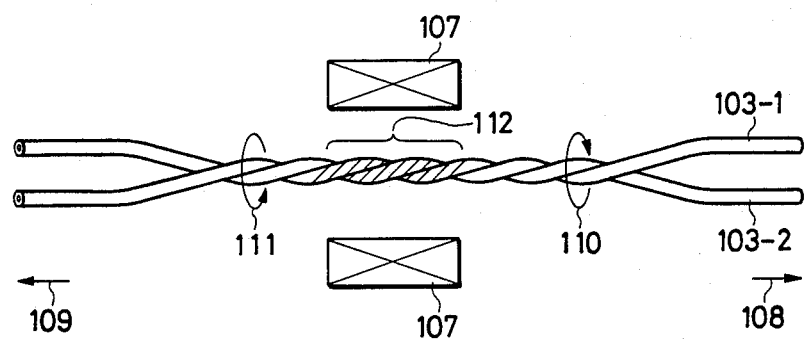
FIG. 6 is a view showing still another embodiment of the manufacturing method of the present invention.

FIG. 6 shows the third embodiment of the method of manufacturing a plastic optical fiber star coupler according to the present invention. In this embodiment, the plastic fibers 103-1 and 103-2 obtained by the method illustrated in FIGS. 5A and 5B are arrayed in parallel in close contact, and the vicinities of the parts with the solvent deposited thereon are heated by a heating source 107 (in this case, an electric heater was used). When the heating is conducted in an oxidizing atmosphere, the fiber surface sometimes reacts with oxygen to develop a coloring phenomenon, and hence, the heating should preferably be conducted in an inactive gas atmosphere. Suitable for the inactive gas atmosphere is $N_2$, Ar, He or the like or a gaseous mixture consisting of them. The fiber bundle is pulled in the directions of arrows 108 and 109 while being rotated in the directions of arrows 110 and 111 and being thus twisted in accordance with the softening of the fibers owing to the heating, whereby a biconically tapered shape is formed in a region 112. In addition, a fiber bundle without the deposition of the solvent was similarly heated, twisted and pulled to prepare a biconically tapered shape, and the transmission characteristics of the prior art and the present invention were compared. In the case of the third embodiment, the branching ratio was 1-to-1 and the excess loss was 1.2 dB, whereas in the case of the prior art without the deposition of the solvent, the branching ratio was 1.4-to-0.6 and the excess loss was 2.3 dB. Besides, in the case of the prior art, the two fibers were not completely fused together, and they were separated when drawn coercively. In contrast, in the case of this embodiment, the two fibers were completely fused together. Thus, the significant differences of the characteristics as mentioned above will have arisen. More specifically, in the case of the prior art, the fiber surface will be polluted with impurities etc. and will therefore be difficult to melt. In the case of the present invention, the solvent deposition will have a surface etching effect, and moreover, the dissolution of the surfaces will hold the fibers easy to be bonded to each other. In FIG. 6, the fiber bundle may well be twisted before being heated. When the fiber bundle is twisted beforehand in this manner and the twisted part is heated, fused and pulled, the process is simplified to ensure a good reproducibility. It is also allowed to twist the fiber bundle beforehand and to further twist the twisted part in the course of heating, fusing and pulling it. The additional twisting functions to couple the fibers more closely.

Figure 7:
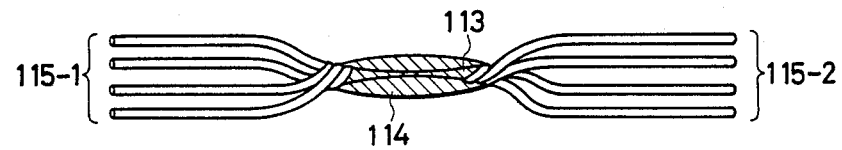
FIG. 7 is a schematic view of a plastic optical fiber star coupler in an embodiment of the present invention.

FIG. 7 shows an embodiment of the plastic optical fiber star coupler of the present invention. It corresponds to a case where the numbers of input and output port fibers 115-1 and 115-2 are four respectively. Numeral 113 designates a biconically tapered portion, and numeral 114 a cover material of high polymer for protecting the biconically tapered portion 113. The cover material 114 may be a material the refractive index of which is equal to or lower than that of the cladding material of the fiber. By way of example, in a case where the cladding is made of polymethyl methacrylate, the biconically tapered portion is similarly covered with polymethyl methacrylate or is covered with a fluoro-polymer (for example, polyvinylidene fluoride or the copolymer between vinylidene fluoride and tetrafluoroethylene).

The present invention is not restricted to the above embodiments. By way of example, it is effective to couple the fibers more closely and to reduce the excess loss that, in FIG. 5A, the solvent 105 contains therein a dopant which diffuses from the outer peripheral surface of the cladding of the optical fiber into the cladding to raise the refractive index of this cladding. As an example of the dopant, x weight-parts of styrene monomer and y weight-parts of methyl methacrylate monomer are mixed into the solvent. The refractive index can be controlled by changing the ratio between the values x and y. This embodiment is applicable to plastic fibers of various core materials and cladding materials. The materials are, for example, polycarbonate, polychlorostyrene, polytrifluoroisopropyl methacrylate, diethyleneglycol bisarylcarbonate, and Teflon (trade name of Du Pont Inc.). As another example, dimethylformamide was used as the solvent for a core material of polymethyl methacrylate and a cladding material of polyvinylidene fluoride. Also in this case, fibers were favorably fused together, and the branching ratio and the excess loss were favorable characteristics as stated before.

According to the third embodiment, a plastic optical fiber star coupler of novel structure having excellent branching ratio and excess loss characteristics can be obtained with ease. Moreover, even when the star coupler is used over a long term, degradation is difficult to occur because a biconically tapered portion is completely fused integrally.

Next, the fourth embodiment of the method of manufacturing a platic optical fiber star coupler according to the present invention will be described.

Figure 8:
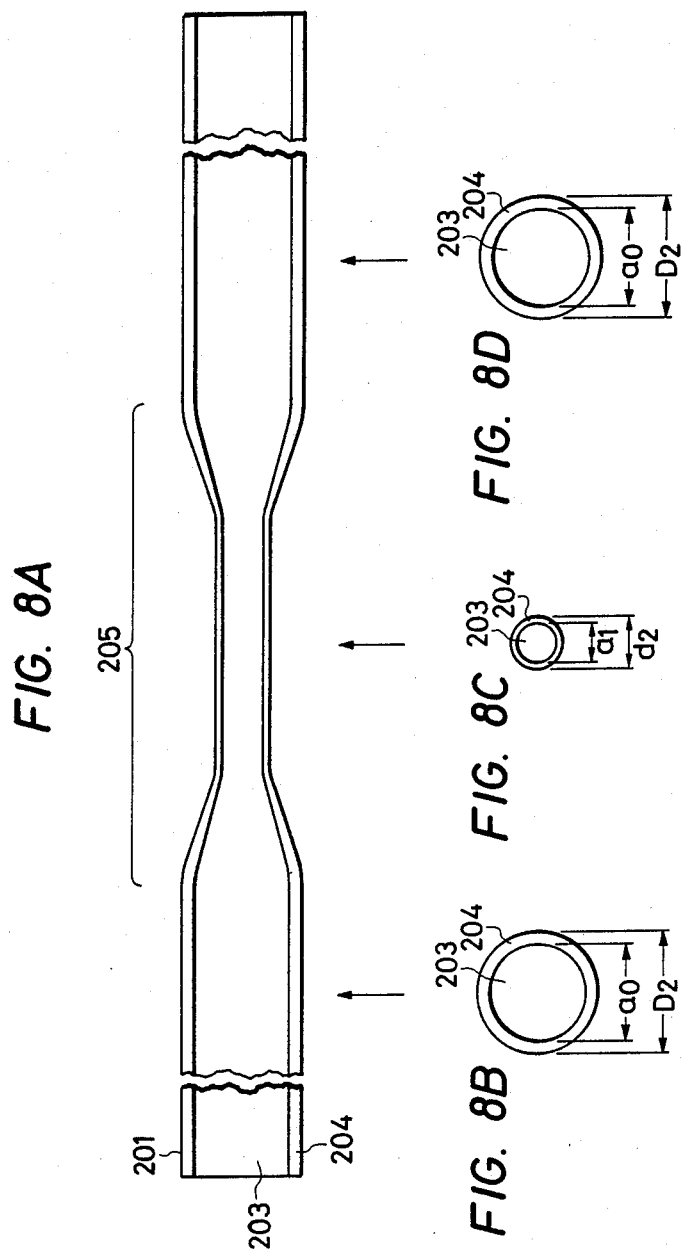
FIGS. 8A to 8D are a longitudinal sectional view and transverse sectional views of a pulled optical fiber for use in the optical fiber star coupler of the present invention.

It is the first feature of the present embodiment that a plastic optical fiber 201 is pulled as shown in FIG. 8A beforehand, to form a biconically tapered shape and to waist the middle part 205 thereof. FIGS. 8B to 8D show the sections of the parts of the plastic optical fiber in FIG. 8A respectively indicated by arrows. In the figures, numeral 203 denotes a core, and numeral 204 a cladding. When the fiber is pulled beforehand in this manner, the conversion from a core mode into a cladding mode is promoted in the tapered portion on the input side of the fiber. Moreover, since the individual fibers are pulled one by one or a plurality of fibers not bundled are pulled, the fibers can be uniformly pulled. Therefore, the amounts of conversion from the core mode into the cladding mode in the respective fibers can be held constant. The rate $K_c$ of the conversion from the core mode into the cladding mode is expressed by:

$$K_c = \left\{ 1 - \left(\frac{a_1}{a_0}\right)^2 \right\} \times 100\% \tag{3}$$

where $a_0$: diameter of the core of the fiber before the pulling,
$a_1$: diameter of the core of the middle part 205 after the pulling.

This value $K_c$ is equal to the decreasing rate $K_p$ of propagating mode numbers ($N_0$, $N_1$) before and after the pulling. That is, $$K_p = \frac{N_0 - N_1}{N_0} \times 100\% \tag{4}$$

where $$N_0 = \frac{1}{2}\left(\frac{2\pi a_0}{\lambda} \sqrt{n_1^2 - n_2^2}\right)^2 \tag{5}$$

-continued $$N_1 = \frac{1}{2}\left(\frac{2\pi a_1}{\lambda}\sqrt{n_1^2 - n_2^2}\right)^2 \quad (6)$$

Figure 9:
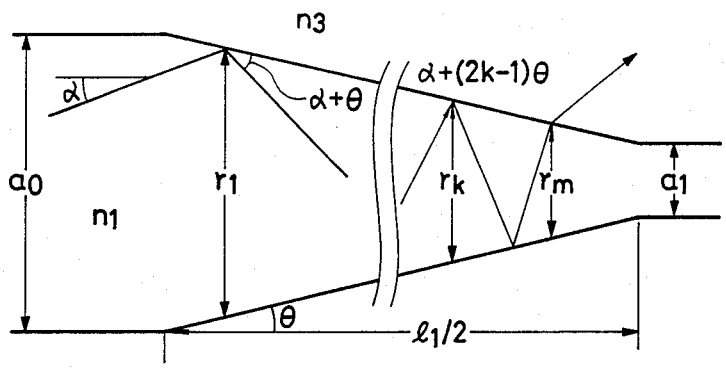
FIG. 9 is a longitudinal sectional view of a tapered-shape optical fiber used for calculating characteristics.

When the propagating mode numbers and the decreasing rates thereof as based on the pulling are calculated using Eqs. (4), (5) and (6), results in FIG. 14 are obtained. As understood from FIG. 14, as the pulling ratio is set greater, the number of modes propagating within the core decreases more, and the conversion rate from the core mode into the cladding mode becomes higher. More specifically, as the conversion rate from the core mode into the cladding mode rises more, the division of light becomes easier, and the number of times of twisting can be reduced accordingly. As a result, the excess loss can be lessened. Moreover, since the individual fibers have been uniformly pulled, the divisions of light in the tapered portions of the input side become uniform, and the conversion rates from the cladding mode into the core mode become uniform in the tapered portions of the output side, so that the power deviation can be suppressed to a very small value. Besides, since the cladding is uniformly thinned by the pulling, the excess loss can be reduced more. However, when the fiber is pulled excessively, radiation in the tapered portion takes place. Letting $r_m$ denote the diameter of the fiber at which the radiation occurs, a non-radiation condition will be found. When the thickness of the cladding in the tapered portion is assumed to be small and is neglected, a light beam having entered the tapered portion propagates while being reflected by the interfaces between the core and the air. Each time the light beam is reflected, the angle of reflection increases (FIG. 9). The non-radiation condition in the state of FIG. 9 is:

$$r_m < a_1 \quad (7)$$

where $$r_m \approx r_1 - 2\tan\sum_{q=1}^{m-1} r_q \cot(\alpha + 2q\theta) \quad (8)$$

q: plus integer which denotes the number of times of the reflection of light in the tapered portion.

$$m = \left[\frac{\cos^{-1}\left(\frac{n_3}{n_1}\right) - \alpha + \theta}{2\theta}\right] + 1 \quad (9)$$

$n_3$: refractive index of the air.

$$\theta = \tan^{-1}\left(\frac{a_0 - a_1}{l_1}\right) \quad (10)$$

Figure 15:
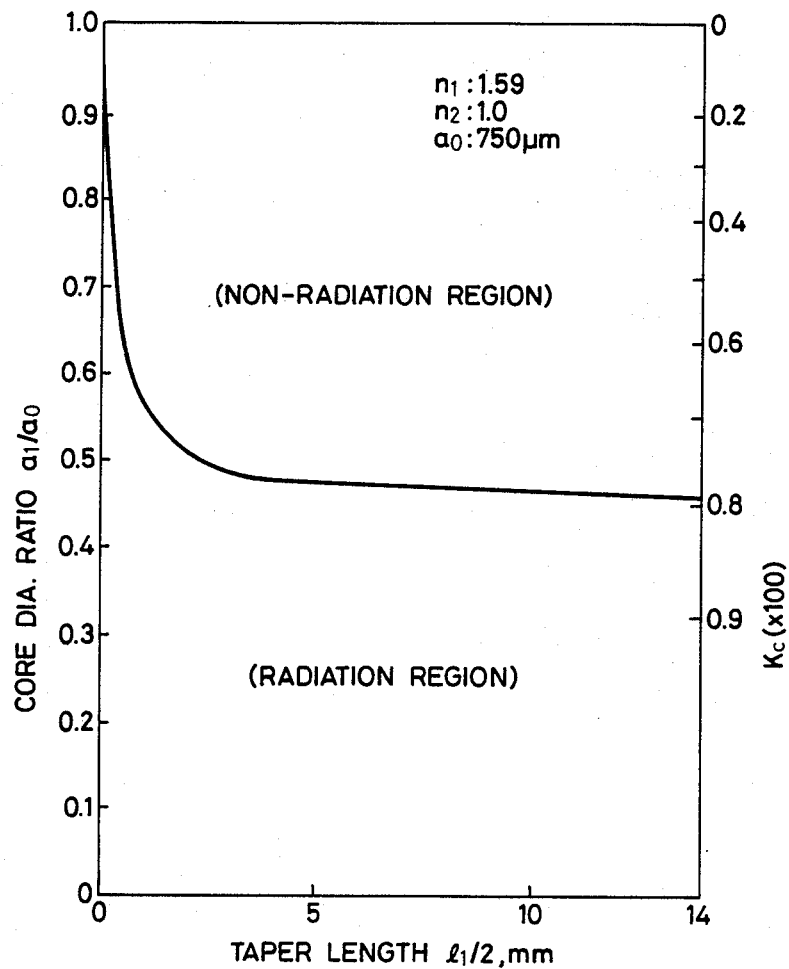
FIG. 15 is a diagram showing the relationship between the core diameter ratio and the rate $K_c$ of conversion from a core mode to a cladding mode.

Results calculated using the above equations (3), (7), (8), (9) and (10) are shown in FIG. 15. In view of the results, the conversion rate $K_c$ from the core mode into the cladding mode under the non-radiation condition becomes about 80%. Accordingly, the degree of the previous pulling may be determined in consideration of the above equations. That is, the core diameter $a_1$ of the middle part 205 after the pulling must not be smaller than 50% of the core diameter $a_0$ before the pulling.

The second feature of the present embodiment consists in that the fibers pulled in advance are bundled, and that the waisted portion of the middle parts of the bundled fibers is twisted while being heated or is slightly pulled while being twisted. That is, only the waisted middle portion is twisted and is slightly pulled, and the resulting portion is used as a so-called mixing portion. In the mixing portion, about 20 % of the core mode not converted into the cladding mode is entirely converted into the cladding mode, whereby the whole mode is mixed and divided. Moreover, since the waist portion is processed, the temperatures of the outer peripheral part and central part of the bundle are substantially equal, and besides, the pulling length is small, so that the respective fibers are uniformly pulled. In addition, since the waist portion is processed, the ruggedness of the outer peripheral part subjected to the twisting is slight, and scattering and radiation loss in this part are slight. Further, since the tapered portions of the input and output parts of the optical star coupler finished up include almost no twisted parts, unnecessary scattering and radiation loss are slight.

Figure 10A:
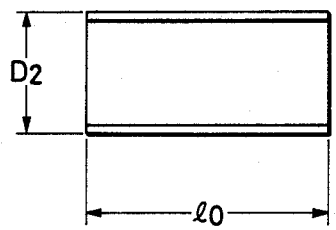
FIGS. 10A and 10B are longitudinal sectional views of fibers before and after pulling assumed for calculating characteristics in FIG. 14, respectively.
Figure 10B:
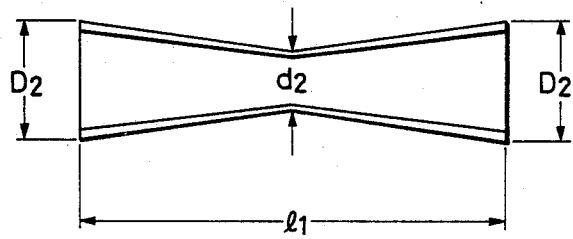

To be added is that the relationship between the pulling ratio and the cladding diameter in FIG. 14 has been obtained from the following equation, assuming the rectilinear pulling of the fiber as shown in FIGS. 10A and 10B. The pulling ratio $l_1/l_0$ is expressed by:

$$\frac{l_1}{l_0} = \frac{3 D_2^2 (D_2 - d_2)}{D_2^3 - d_2^3} \quad (11)$$

where
 $l_0$: length of the fiber before the pulling,
 $l_1$: length of the fiber after the pulling,
 $D_2$: outside diameter of the fiber before the pulling,
 $d_2$: outside diameter of the fiber in the waist portion after the pulling.

Figure 11A:
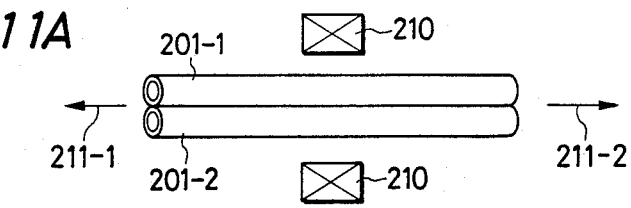
FIGS. 11A to 11E are views showing still another embodiment of the method of manufacturing an optical fiber star coupler according to the present invention.
Figure 11B:
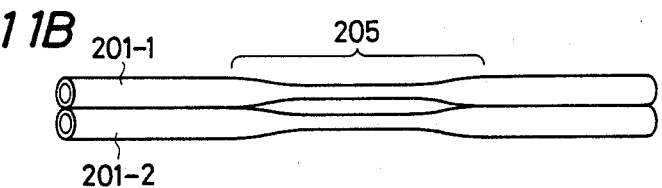
Figure 11C:
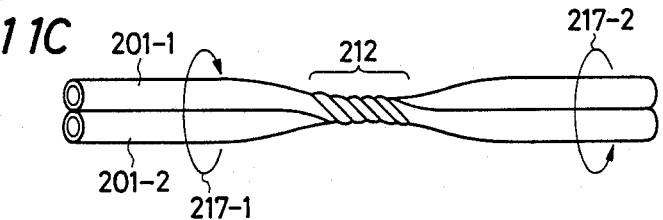
Figure 11D:
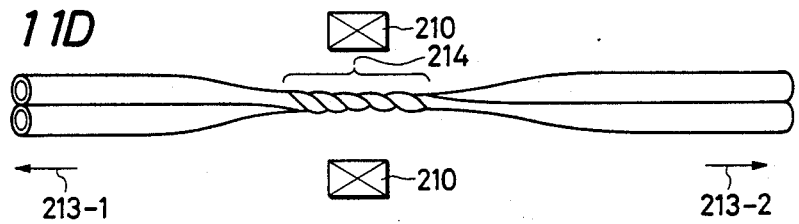
Figure 11E:
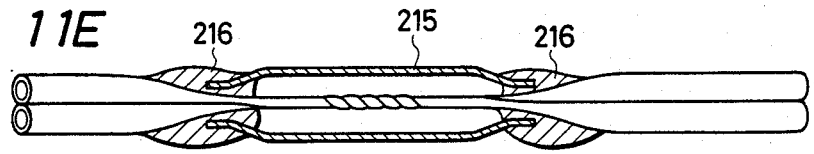
Figure 13B:
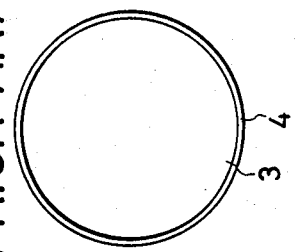
FIGS. 13A and 13B are a longitudinal sectional view and a transverse sectional view of a plastic optical fiber, respectively.

FIGS. 11A to 11E show schematic views of all the steps of the method of manufacturing the plastic optical fiber star coupler in the fourth embodiment of the present invention and the structure of the optical star coupler obtained by the method. These exemplify a 2×2 port type optical star coupler in which two plastic fibers 201-1 and 201-2 to form two input ports and two output ports, and the method of manufacturing it. First, as shown in FIG. 11A, two fibers are arranged in parallel, and while the middle parts of the parallel fibers are being heated by a heating source 210, the fibers are pulled in the directions of arrows 211-1 and 211-2, to be formed into a structure as shown in FIG. 11B. The shape and dimensions of the pulled portion 205 are made as illustrated in FIGS. 8A and 8B and FIG. 14. Subsequently, as shown in FIG. 11C, the parallel fibers are rotated in the directions of arrows 217-1 and 217-2 so as to apply twisting 212 to the pulled portion 205. The number of times of the twisting is set small when the pulling ratio is large, whereas it is set large when the pulling ratio is small. The number of times of the twisting may be 2-5 or so. Next, as shown in FIG. 11D, the parallel fibers are pulled in the directions of arrows 213-1 and 213-2 again while the twisted portion 212 is being heated by the heating source 210. The pulling in this case is performed so as to attain an equally dividing characteristic. More specifically, light is caused to enter the end of either fiber on one side of the parallel fibers, and it is monitored if optical outputs emergent from the output ends of both the parallel fibers on the opposite side become substantially equal. At the stage at which the substantially equally dividing characteristic has been attained, the heating and the pulling are ended. In this case, it is also allowed to perform the pulling while a gas is kept flowing around the twisted portion of the fibers and to increase the flow rate of the gas suddenly and cool the twisted portion the moment the equal division has been substantially attained. With this measure, the mixing of impurities into the twisted and pulled portion can be prevented, and the labor of raising and lowering the temperature of the heating source can also be saved. Thereafter, if necessary, as shown in FIG. 11E, the twisted, fused and pulled portion 214 is covered with a protective tube 215, and the protective tube 215 and the fibers are fixed by a binder 216, whereby the plastic optical fiber star coupler can be obtained. The protective tube 215 serves to protect the portion 214 against fluctuations in the excess loss and the power deviation characteristic, and it may be a dielectric substance tube (for example, a glass tube or plastic tube), a magnetic substance tube (for example, a ceramic tube), a conductor tube (for example, a metal tube) or the like.

The present invention is not restricted to the above embodiment. The steps of FIG. 11C and FIG. 11D may well be performed simultaneously. In other words, the fibers may well be twisted, fused and pulled while being heated. The number of plastic fibers is not limited to two, but it may well be three to one hundred or so. The fourth embodiment is also effective in case of employing glass fibers otherwise than the plastic fibers. In the case of the glass fibers, the index difference between a core and a cladding is as small as about 1%, so that the pulling ratio in the case of the previous pulling need not be set large.

According to this embodiment, both the low excess loss and the equally dividing characteristic can be met in an optical star coupler which employs optical fibers of large diameter and high NA. In addition, the optical star coupler can be manufactured at low cost by a through process.

Figure 12B:
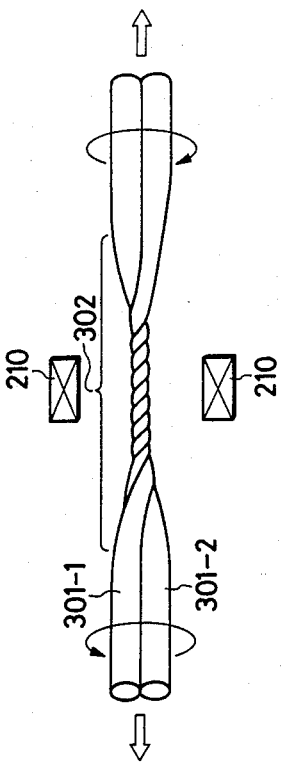
FIGS. 12A and 12B are views showing an optical fiber star coupler studied for an experiment, which does not conform to the present invention.
Figure 12A:
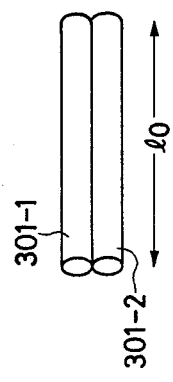
Figure 13A:
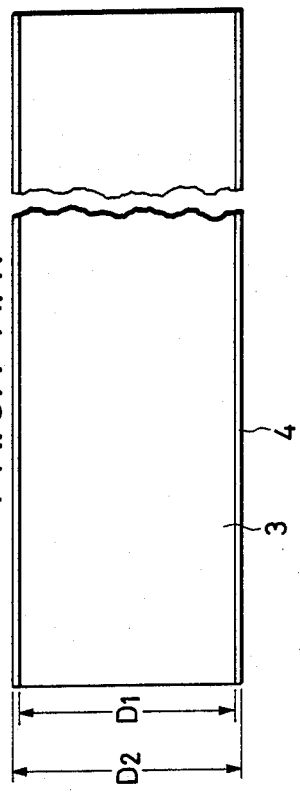

FIGS. 12A and 12B show a plastic optical fiber coupler which was fabricated without conforming to the present invention for the purpose of a comparison experiment. In this case, the middle parts of two plastic optical fibers 301-1 and 301-2 were not pulled in advance. The plastic fibers 301-1 and 301-2 had the middle parts twisted and pulled in the axial directions thereof while the middle parts were being heated by a heating source 10, whereby a biconically tapered portion 302 was formed. In this case, to the end of realizing an equally dividing characteristic, the core mode needed to be converted into the cladding mode at a stretch by increasing the number of times of twisting and shortening the pitch of the twisting in the extreme as compared with those in the case of resorting to the present invention. However, when the number of times of the twisting was increased and the twisting pitch was shortened in this manner, the radiation mode augmented, and the radiation loss became heavy, with the result that an excess loss of 5 dB arose.

What is claimed is:

1. A method of manufacturing a plastic optical fiber star coupler comprising the steps of twisting and pulling a bundle of plastic optical fibers while heating the vicinity of a middle part of the fiber bundle, thereby to form a biconically tapered portion; and blowing a gas against an outer peripheral surface of said biconically tapered portion when a desired shape has been attained, thereby to cool said biconically tapered portion.

2. A plastic optical fiber star coupler according to claim 1, wherein light is put into any fiber on an input side of the optical fiber bundle, emergent lights from the fibers on an output side are detected by optical detectors, and said gas is blown when respective emergent light intensities have become substantially equal.

3. A method of manufacturing a plastic optical fiber star coupler according to claim 7, wherein the heating is stopped substantially simultaneously with the blowing of said gas.

4. A method of manufacturing a plastic optical fiber star coupler according to claim 1, wherein the heating is conducted with a burner which uses a combustible gas containing no oxidizing gas.

5. A method of manufacturing a plastic optical fiber star coupler according to claim 1, wherein said bundle of plastic optical fibers is indirectly heated through a glass plate or a glass tube.

6. A method of manufacturing a plastic optical fiber star coupler comprising the steps of depositing a solvent compatible with plastic optical fibers onto an outer peripheral surface of each of the optical fibers of an optical fiber bundle or onto an outer peripheral surface of said bundle; and heating, twisting and pulling the solvent-deposited part of said optical fiber bundle, thereby to form a biconically tapered portion.

7. A method of manufacturing a plastic optical fiber star coupler according to claim 6, further comprising the step of twisting said optical fiber bundle in advance of the heating of said fiber bundle.

8. A method of manufacturing a plastic optical fiber star coupler according to claim 6, wherein said solvent contains a dopant which diffuses from an outer peripheral surface of a cladding of said optical fiber into said cladding and raises a refractive index of said cladding.

9. A method of manufacturing a plastic optical fiber star coupler according to claim 6, further comprising the step of covering an outer periphery of said optical fiber bundle including said biconically tapered portion, with a polymer which has a refractive index not higher than that of the fiber bundle outer periphery.

10. A method of manufacturing a plastic optical fiber star coupler according to claim 6, wherein said solvent contains a depressor which depresses dissolution of the outer peripheral surface of said optical fiber.

11. A method of manufacturing a plastic optical fiber star coupler according to claim 6, wherein an atmosphere during the heating of said fiber bundle is held at an inactive gas atmosphere.

* * * * *